United States Patent [19]

Sears et al.

[11] 3,714,948
[45] Feb. 6, 1973

[54] BRUSH BACK ROLLER

[75] Inventors: Bobby Joe Sears; Wade E. Brown, both of Hoopeston, Ill.

[73] Assignee: FMC Corporation, San Jose, Calif.

[22] Filed: Aug. 10, 1971

[21] Appl. No.: 170,536

[52] U.S. Cl. ............... 130/5 R, 56/13.5, 198/33 AA
[51] Int. Cl. .............................................. A01f 12/10
[58] Field of Search ... 130/5 R, 5 B, 5 G; 198/33 AA; 56/13.3, 13.5, 16.3

[56] References Cited

UNITED STATES PATENTS

| 999,128 | 7/1911 | Smith | 130/5 R |
|---|---|---|---|
| 2,619,967 | 12/1952 | Bond | 130/5 G |

*Primary Examiner*—Antonio F. Guida
*Attorney*—F. W. Anderson et al.

[57] ABSTRACT

A conveyor system for supplying ears or corn to a processing machine includes a cleated elevator conveyor for the corn, and a double helix brush back rotor is disposed above the elevator conveyor for leveling the ears of corn on the conveyor as well as for laying down upwardly projecting ears from the sides of the conveyor towards the midplane thereof.

4 Claims, 9 Drawing Figures

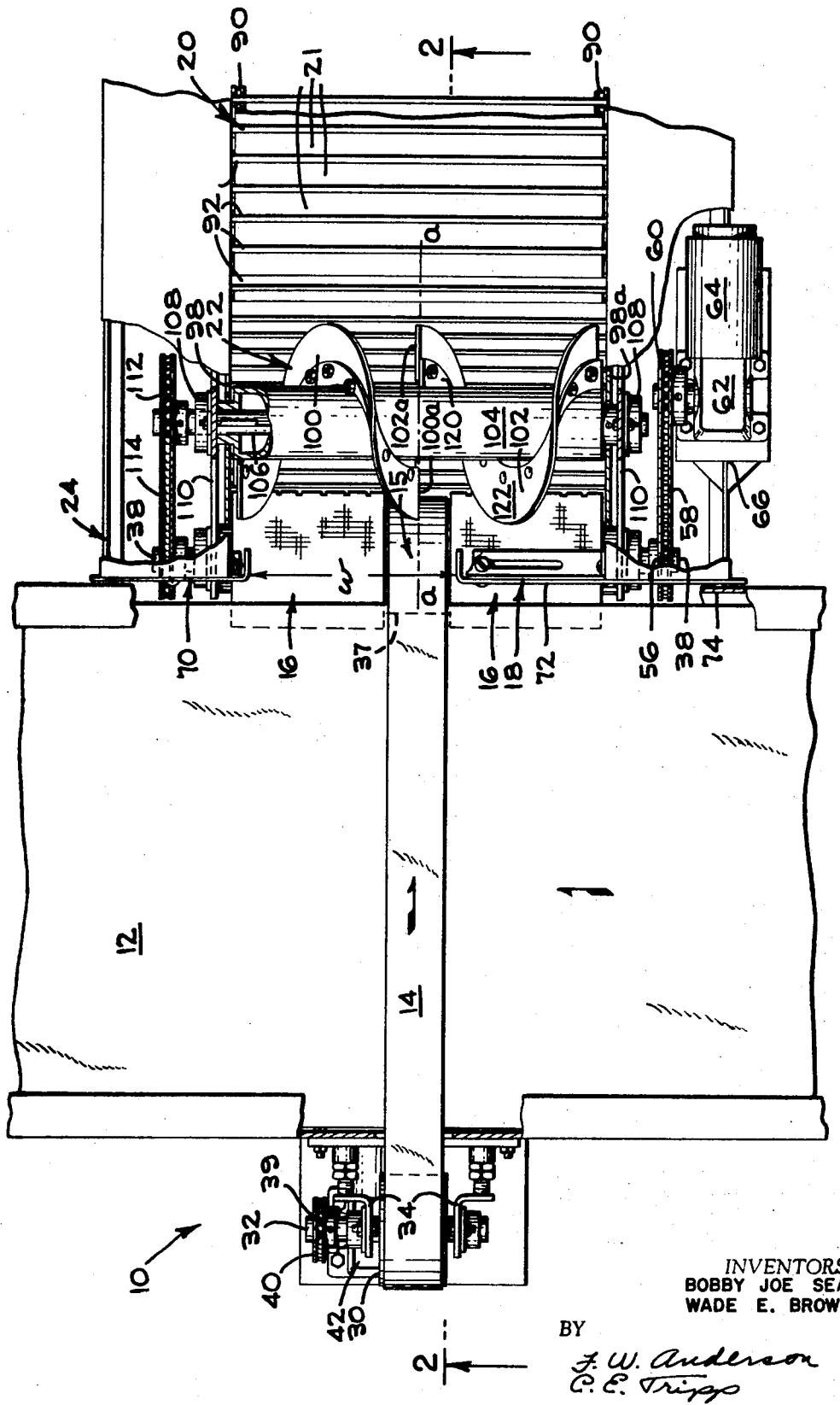

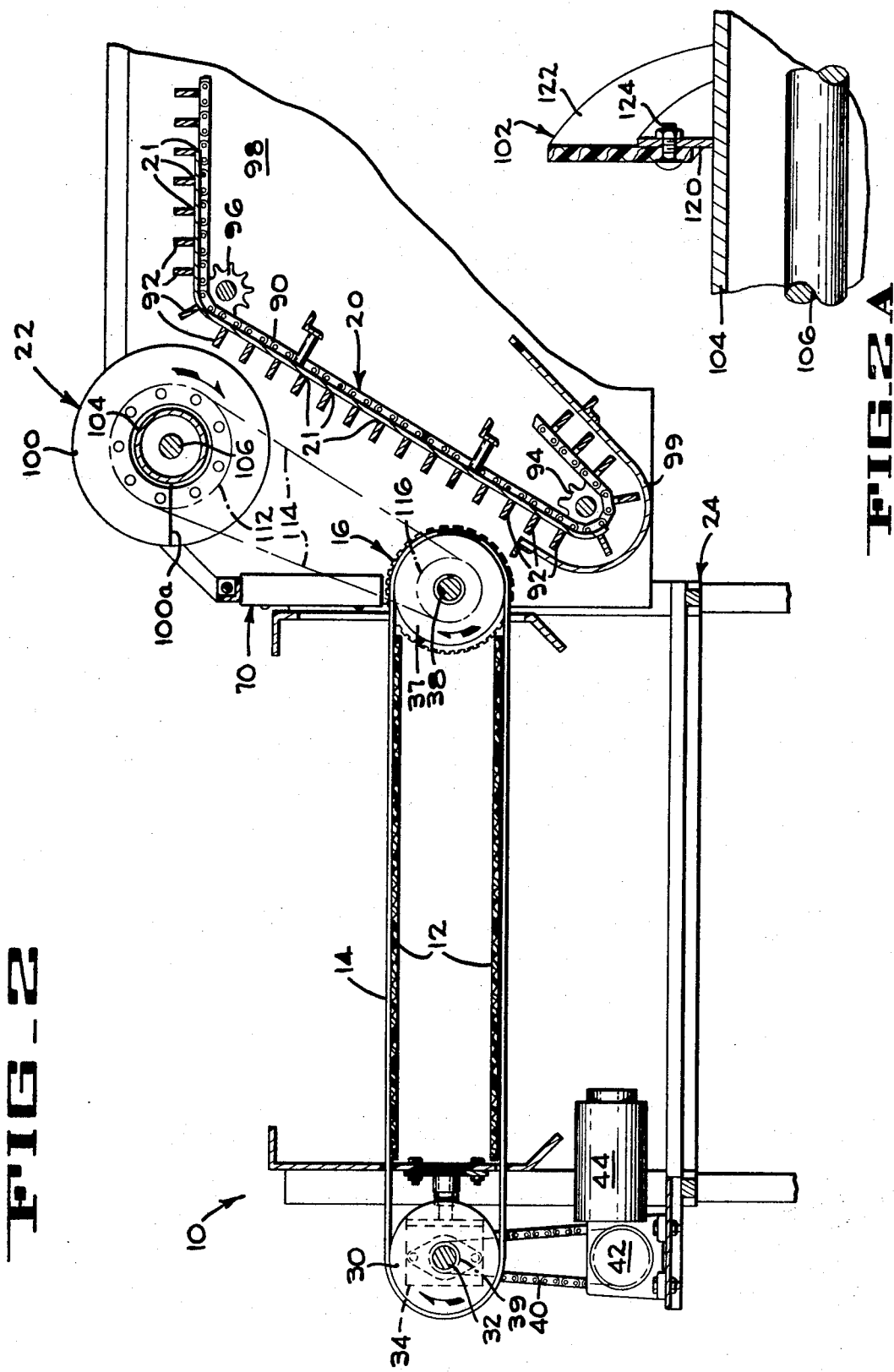

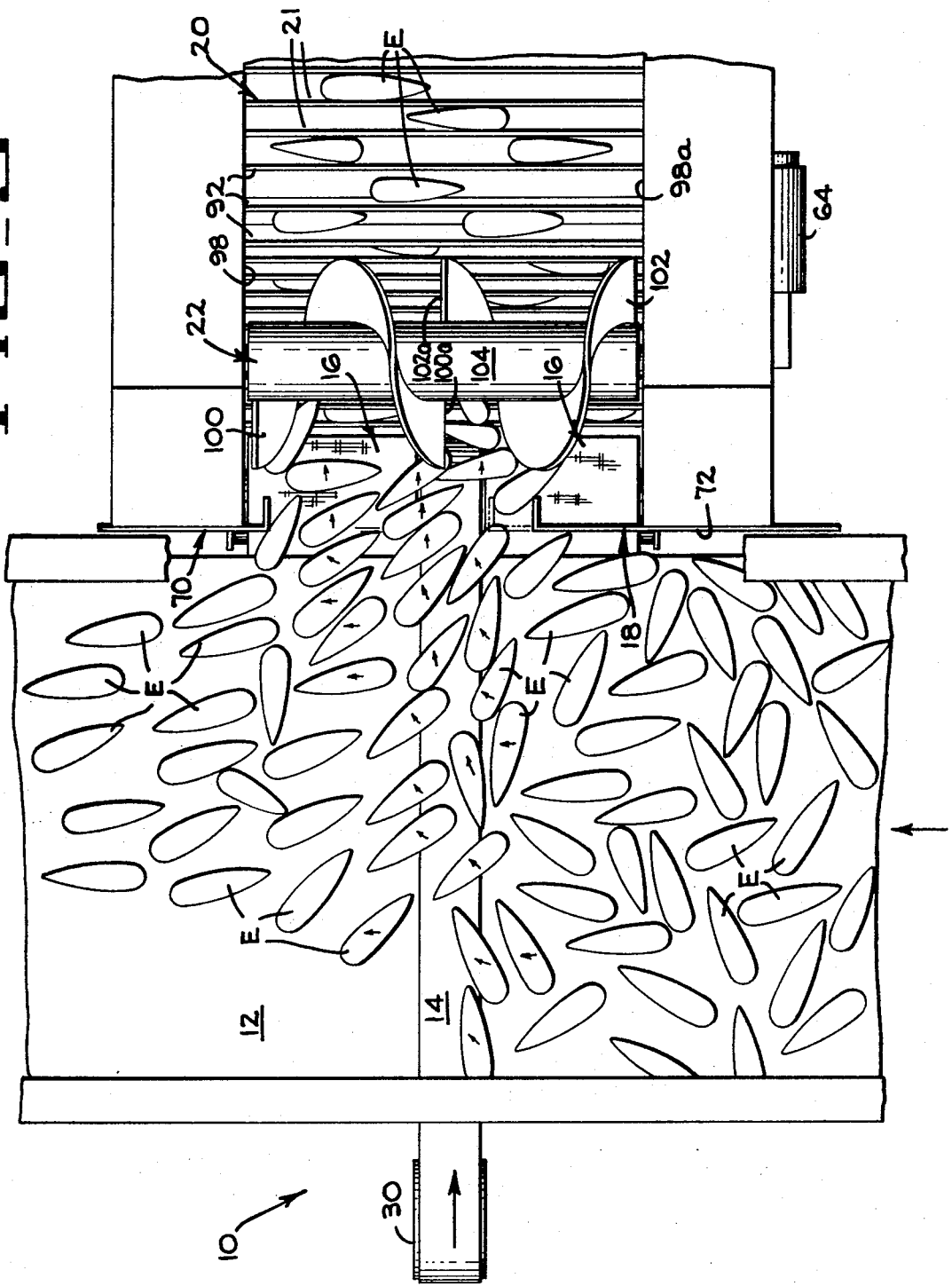

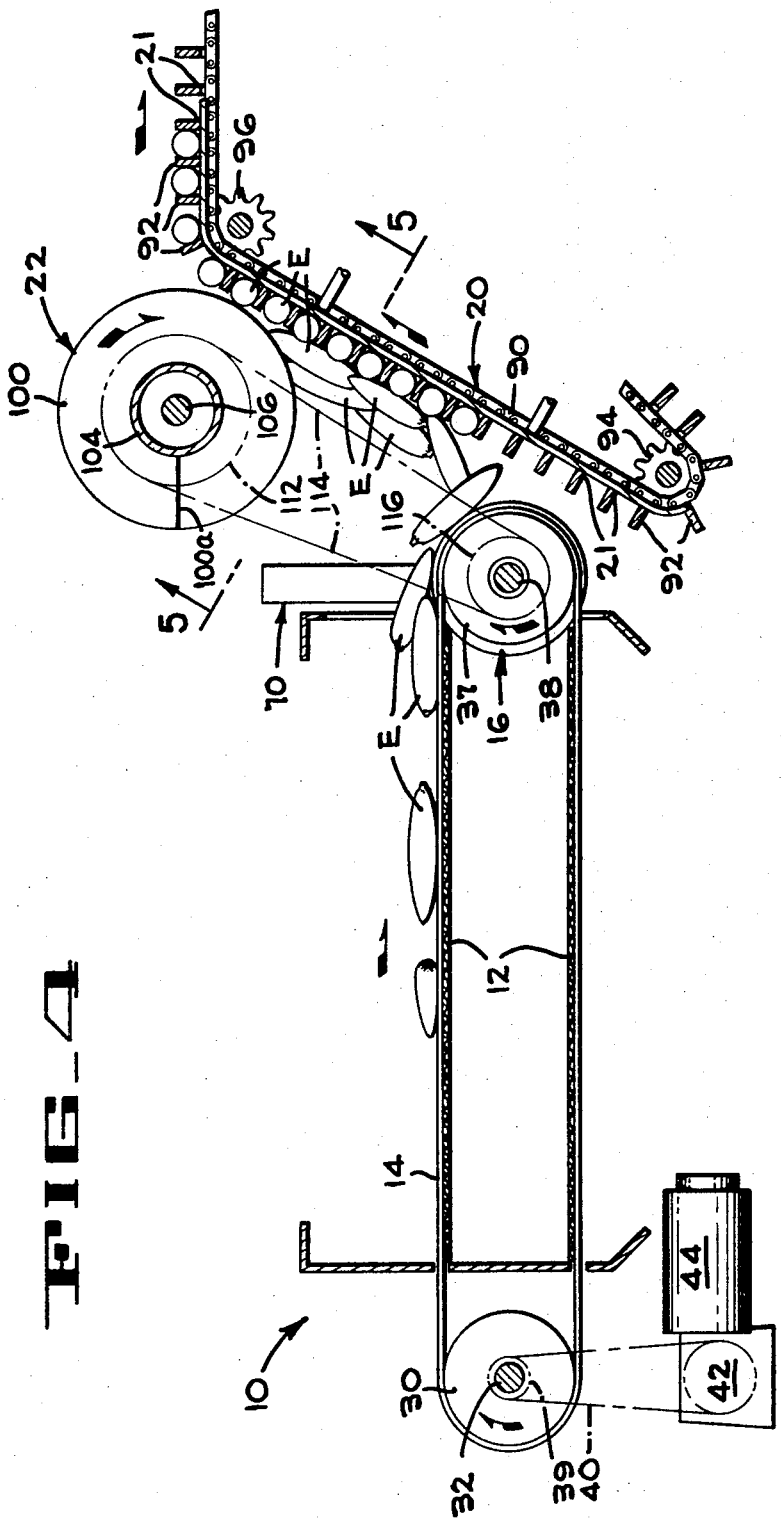

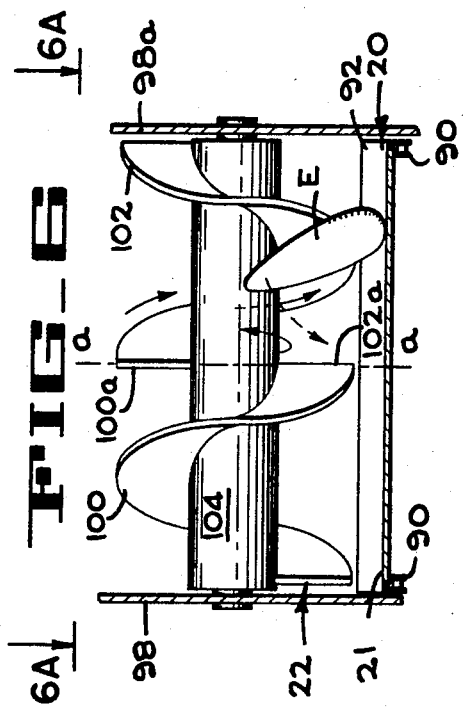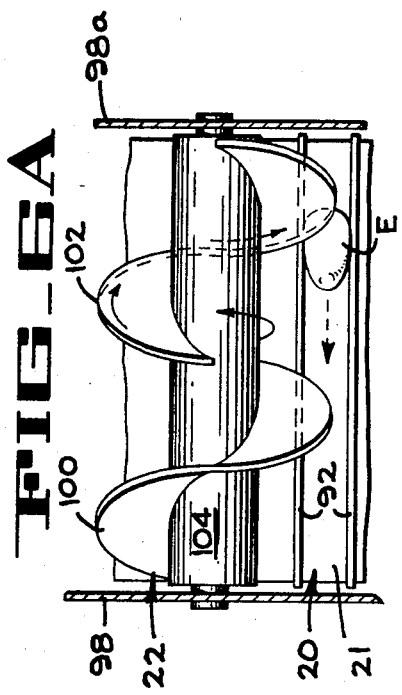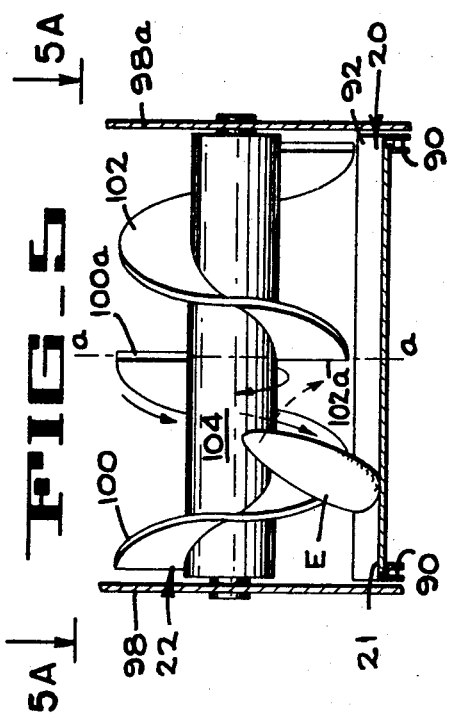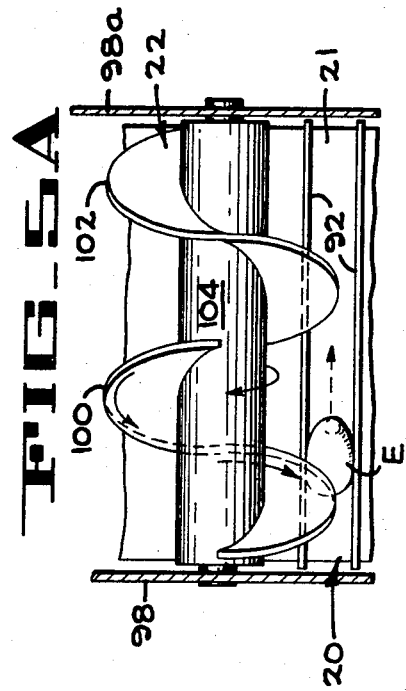

BRUSH BACK ROLLER

FIELD OF THE INVENTION

This invention relates to material handling and more specifically to a combination of a cleated elevator conveyor and a double helical brush back auger disposed thereabove for distributing articles such as ears of corn on the elevator conveyor.

REFERENCE TO RELATED APPLICATIONS

The double helical brush back auger of this invention is illustrated as applied to a self-metering distribution system of the type claimed in the copending application of Kuhn et al. Ser. No. 170,543, filed Aug. 10, 1971, assigned to the FMC Corporation.

DESCRIPTION OF PRIOR ART

The U.S. Pat. to Greedy et al., No. 3,113,574, Dec. 10, 1963 shows an elevator conveyor having widely spaced cleats and with a brush back rotor above the conveyor and formed of axially extending flexible flaps for leveling the product.

The U.S. Pat. to Krahn, No. 2,893,537, July 7, 1959 shows a crop pick up mechanism having a double helix auger for urging the crop toward a central elevator conveyor. The auger is not contra-rotating but rotates in the direction of pick up, and each helix terminates in axially extending flexible flaps that are substantially coextensive with the width of the take away conveyor.

The U.S. Pat. to Schaefer, No. 289,718, Dec. 4, 1883 shows a feed governor for cotton gins including a contra-rotating leveling auger formed of a double helix with the midplane ends of the helix coming together in a manner which forms a wedge shaped pocket. The helix spreads the cotton from the midplane of the underlying conveyor toward the sides of the feed box.

The U.S. Pat. to Asper, No. 1,056,728, Mar. 18, 1913 shows a cleated elevator conveyor for ears of corn with spring loaded brushes above and below the elevating flight for rolling ears into the pockets of the conveyor.

The U.S. Pat. to Bond, No. 2,619,967, Dec. 2, 1952 shows longitudinally rotatable corn husker rolls with three superposed helical augers for moving the corn laterally across the husker.

SUMMARY OF THE INVENTION

In the embodiment of the invention illustrated, ears of corn (such as sweet corn) are transferred from a main conveyor to a reserve area above feed rolls. The feed rolls deposit ears of corn haphazardly onto the cleats of an ascending elevator conveyor. The brush back roller of the present invention is disposed above the elevator conveyor, the cleats of the latter being spaced just far enough to accommodate the larger ears of corn in order that these can be singulated in rows for delivery to a corn cutter or the like. The function of the brush back conveyor of the present invention is twofold. It performs the known function of devices of this type by leveling the products on the elevator conveyor so that ears of corn are not superposed on each other when they reach the corn cutter. However, due to the relatively close spacing of the cleats of the elevator conveyor and the manner in which the mass of ears are fed thereto by the diverting system, ears sometimes are wedged or otherwise disposed between the cleats of the conveyor in a manner which causes them to project or stand up radially from that conveyor. Such ears (having been husked) are subject to damage by prior type leveling devices or other parts of the machine if they are not gently layed down in the desired manner between the cleats of the elevator, and this is particularly true of ears adjacent the sidewalls of the elevator, where pile ups are most likely to occur. The brush back roller of the present invention is in the form of a contra-rotating, double helix auger, the lead of each helix being such that its action against upstanding ears is to lay the ears down from the side walls of the elevator conveyor toward its midplane. The inner or midplane ends of the two opposite handed helices are diametrically opposed and lie substantially in a common plane at the elevator conveyor midplane. With this construction, there are no wedge shaped pockets or obstructions at the midplane which will catch and damage the relatively delicate ears of corn being handled by the machine.

BRIEF DESCRIPTION OF THE DRAWINGS

FIG. 1 is a plan of a diverter system embodying the brush back conveyor of the present invention.

FIG. 2 is a central longitudinal section taken on line 2—2 of FIG. 1.

FIG. 2A is an enlarged section through one brush back helix.

FIG. 3 is a simplified plan of the system showing the flow of ears of corn therein.

FIG. 4 is a section like that of FIG. 2 showing the leveling operation of the brush back roller.

FIG. 5 is an operational view looking along 5—5 of FIG. 4 showing the lay-down action of one helix.

FIG. 5A is a plan view taken in the direction of arrows like FIG. 5 but looking along 5A—5A of FIG. 5.

FIGS. 6 and 6A are views like FIGS. 5 and 5A for the other helix.

DETAILED DESCRIPTION

General Description of a System Embodying the Invention

A diverter system 10 embodying the present invention (FIGS. 1 and 2) includes a wide, horizontally running main conveyor belt 12, which is an endless belt having the usual drive and idler pulleys (not shown) at each end. Running transversely of the main belt 12 is a narrow, low profile diverter belt 14. The delivery end of the diverter belt 14 is flanked by feed rollers 16 and an adjustable gate indicated generally at 18 provides a delivery port having a width w for admitting the ears of corn to the feed rollers 16 from the main belt 12. The ears of corn are delivered by the feed rollers 16 to an ascending reach of a cleated take away conveyor indicated generally at 20. The double helix brush back roller of the present invention, indicated generally at 22, is disposed above the conveyor 20 in order to level the mass of ears deposited on the take away conveyor 20 to dispose the ears lengthwise in the pockets 21 of that conveyor, as well as to knock down upstanding ears.

The conveyor apparatus shown in the drawings is described in detail in the aforesaid pending application of Kuhn et al. Briefly, the parts are supported on a framework illustrated generally at 24. The diverter belt 14, which runs flat across the main belt 12, is trained around a drive pulley 30 mounted on a shaft 32 that runs in bearings supported in spaced brackets 34 (FIG. 1) mounted on the frame 24. The delivery end 15 of the diverter belt 14 is trained around an idler pulley 37 loosely mounted on a shaft 38, as described in the aforesaid application of Kuhn et al. The drive pulley 30 for the diverter belt has a drive sprocket 39 on the shaft 32 (FIG. 1) and is driven by a chain 40 (FIG. 2) and a sprocket for that chain on the shaft of a gearbox 42. The gearbox is connected to an electric motor 44. Thus, the speed of the diverter belt 14 is independent of the speeds of the other elements of the system.

The feed rollers 16 are keyed to the same shaft 38 that loosely mounts the delivery idler pulley 37 for the diverter belt. The rollers 16 have a diameter that slightly exceeds that of the diverter belt 14 at the pulley 37. The shaft 38 and hence the feed rollers 16 are rotated to provide a peripheral speed somewhat higher than that of the diverter belt 14. As seen in FIG. 1, a drive sprocket 56 is keyed to one end of the shaft 38 and a chain 58 is trained around the sprocket 56 and a sprocket 60 driven by gear box 62 and an associated electric motor 64. The motor and gear box assembly are mounted on a sub frame 66 supported from the main frame 24.

The adjustable gate 18 (FIGS. 1 and 3) cooperates with a fixed side plate member 70 mounted on the main frame 24 to provide the opening w for the admission of ears of corn to feed rolls 16 and on to the take away conveyor 20. The diverting action of the diverter belt 14 and the feeding action of the feed rolls 16 are adjusted in accordance with the capacity of the take away conveyor 20 by making the gate 18 adjustable to control the horizontal width w (FIG. 3). In the preferred construction illustrated, the adjustable gate 18 comprises a plate 72 that is adjustably mounted to form a continuation of the upstream side plate 74 for the main conveyor 12. The gate 18 is described in detail in the aforesaid pending application.

The take away conveyor 20 is provided to carry ears which are laying horizontally in the pockets 21 up and away from the distributing conveyor system and deliver them to one side of a corn cutter or the like not illustrated in the drawings. Apparatus which receives ears oriented in the cleats of a conveyor and presents them to cutting and orienting devices is shown, for example, in the U.S. Pat. to Ross et al., No. 3,394,805, July 30, 1968, although the utility of the present invention is not limited to use of the patented apparatus.

The take away conveyor 20, the mounting and drive details of which are not critical to the present invention, includes a pair of side chains 90 having special links of known construction that mount transversely extending cleats 92 to form the pockets 21. The cleats 92 are spaced longitudinally of the conveyor by a distance sufficient to receive larger ears of corn, but they are not spaced enough to receive two normally developed ears. The chains 90 for the take away conveyor 20 are trained over sprockets 94, 96 as seen in FIG. 2, and are driven by the machine with which they are associated in a manner not critical to the present invention and hence not illustrated. The conveyor runs between side plates 98 and 98a (FIG. 1) for constraining the ears of corn on the conveyor.

As seen in FIG. 2, a guard plate 99 surrounds the lower loop of the take away conveyor in order to prevent ears of corn that tumble down from the delivery rolls 16 from getting caught in lower parts of the machine or from falling out of the machine.

The brush back roller 22 of the present invention has flexible helical flights 100,102 of opposite hand and disposed so that their rotation urges ears from the outside of the conveyor 20 towards its midplane. The tubular hub 104 of the brush back roller is mounted on a shaft 106, supported on bearings 108 mounted on framework elements 110. The shaft 106 mounts a sprocket 112 (FIG. 1) which is driven by a chain 114 and a drive sprocket 116 (FIG. 2) keyed to the roller shaft 38 previously described. The brush back roller 22 is rotated so that the helical portions thereof adjacent the ascending flight of the take away conveyor 20 move in a direction opposite to that of the conveyor flights 92, in other words, the brush back roller is contra-rotating.

The helical augers 100,102 are of identical construction except that they are twisted around the hub 104 in leads of opposite hand. Stated differently, the helical flights 100,102 each have a lead along the hub relative to their direction of rotation so that as the conveyor 20 carries ears into the rolls, the edge portions of the helical flights that are engaged by upstanding ears progressively move in a direction toward the midplane of the conveyor 20. Thus helices 100,102 urge upstanding ears of corn away from the associated side plate 98 98a of the conveyor 20 toward the conveyor midplane indicated at a—a in FIG. 1. As seen in FIG. 2A wherein only the helix 102 is illustrated by way of example, an upstanding helical flange 120 is welded to the roller hub 104. A strip of rubberized fabric 122 is bolted to the flange 120 by means of bolts 124 to provide a flexible helical periphery for the roller. The helix 100 is of the same construction.

As seen in FIGS. 1, 5 and 6, the midplane ends 100a,102a of the helices 100,102 are diametrically opposed and these ends also lie or terminate in the midplane a—a of the take away conveyor 20.

In a typical installation for handling ears of corn, the main belt 12 will be about 20–30 inches wide and will run at about 120 feet per minute. The diverter belt 14 will be about 2.0 inches wide and will be run at about 120 feet per minute. The feed rollers 16 have a diameter of about 7⅝ inches and turn at about 88 RPM, giving a peripheral speed of the feed rollers 16 of about 175 feet per minute. The width of the take away conveyor 20 will be about 20 inches and its speed about 39 feet per minute. The cleats are about 1.5 inches high and are spaced 3.0 inches. The brush back roller 22 will be about 11¼ inches in diameter and run at about 122 RPM. The hub 104 is about 3¼ inches in diameter and each helix 100,102 has a pitch of about 9.75 inches per revolution.

OPERATION

The operation of the diverter associated with the roller of the present invention, when conveying ears of corn E to the take away conveyor 20, for delivery to a corn processing machine or the like is illustrated diagrammatically in FIGS. 3 and 4. The lay-down operation of the roller 22 on the ears is illustrated in FIGS. 5 - 6A. Referring to FIGS. 3 and 4, as the ears E approach the diverter belt 14 they are pushed up over onto the surface of that belt and hence are urged laterally (to the right in FIG. 3,) towards the gate opening w. The resultant lateral and longitudinal frictional forces on the ears bring them through the gate opening w and into contact with the faster running feed rolls 16, and the latter removes the ears from the reserve supply thus formed and carry them to the pockets 21 formed by cleats 92 on the take away conveyor 20. The take away conveyor 20 can thus be operated so that most of the cleat pockets 21 of the latter conveyor contain one or more ears of corn E. In case the reserve supply is such as to occasionally provide superposed ears on the take away conveyor cleats 92, these ears will be gently brushed back by the flexible helical flaps 122 of the helices 100,102 (FIG. 4).

In addition to the brush back or leveling function of the brush back roller 22 of the present invention, FIGS. 5, 5A and 6, 6A illustrate the lateral sweep or lay down action of the device. FIGS. 5 and 5A show how the helical section 100 of the brush back roller urges ears of corn E that may be upstanding in the pockets 21 formed by the cleats 92 of the take away conveyor 20 away from the associated side panel 98 of the latter conveyor toward its midplane. Because of the coarse pitch of the helix 100 and because of the manner in which the helix is twisted around the hub 104, upstanding ears are gently pushed or nudged away from the associated side plate 98 of the conveyor 20 toward its midplane thereby facilitating entry of these ears in the pockets 21 formed by the cleats 92 of the conveyor 20. This helps obtain maximum utilization of available space in the take away conveyor 20.

FIG. 5, as noted on FIG. 4, is a view looking along the direction of motion of the ascending flight to the take away conveyor 20. Ears of corn E are being carried by the cleats 92 toward the brush back roller 22 in this view and the helix 100 is constructed and rotated so that the edge thereof that engages the ears of corn is constantly moving to the right in that view, which is toward the midplane of the take away conveyor. Thus, the ears that are substantially to the left of the midplane of the conveyor 20 will always be picked up by the edge of the helix 100, which pushes or nudges them over towards the midplane. This causes a pivoting action about the supports afforded by the cleats 92 of the take away conveyor and hence lays the ears down between those cleats.

FIG. 5A also shows how the edge of helix 100 is constantly moving to the right in that figure, thus engaging upstanding ears E in the pockets 21 between the cleats 92 in the conveyor 20 to urge them toward the midplane of that conveyor. It will also be noted in FIG. 5A that this action takes place before the hub 104 of the brush back roller 102 is engaged by the ears E as they are advanced upwardly by the take away conveyor 20. Thus, FIG. 5A further shows how ears that would otherwise be brushed back are deposited in pockets 21 of the take away conveyor whereby the brush back roller 22 renders utilization of ears delivered to the take away conveyor more efficient than otherwise.

A small percentage of ears may be upstanding exactly at the midplane of the brush back roller but due to the generally cylindrical shape of the ears these ears will almost always be engaged by one or the other of the ends 100,102a of the helices 100,102 in a flancing manner that cause them to be urged toward a prone position on the take away conveyor. Relatively few ears will be (on a statistical basis) standing at this zone, so that even though the lay-down action may not be as effective at the midplane as toward the plates 98,99 of the take away conveyor, those ears will not be caught in any wedge shaped formation created by the two helices 100,102. This precludes damage to the ears by the helical assembly which mode of operation is assured by the arrangement of the ends 100a, 102a of the helices 100,102 so that they are diametrically opposed in a common plane, namely the midplane of the apparatus.

FIGS. 6 and 6A illustrate diagrammatically the laydown action of the helix 102 for ears that are disposed between the midplane of the apparatus and the side plate 98a of the take away conveyor. The action here is simply the reverse of that described in connection with FIGS. 5 and 5A and hence will not be repeated in detail.

Thus, it can be seen that the brush back roller 22 of the present invention not only serves a leveling function but also prevents damage to the delicate ears of corn later along the apparatus by laying down upstanding ears. It also increases the efficiency of the apparatus by finding pockets for ears that would otherwise be brushed back. The flexible construction of the helixes 100,102 provides the combined brush back action without damage to the product.

Although the best mode contemplated for carrying out the present invention has been herein shown and described, it will be apparent that modification and variation may be made without departing from what is regarded to be the subject matter of the invention.

What we claim is:

1. A conveyor system for supplying ears of corn to a processing machine, said system including a cleated elevator conveyor having side walls, means to supply a lower portion of the conveyor with corn, and a contra rotating brush back rotor above said conveyor; the improvement wherein the cleats on said conveyor are spaced so as to accommodate only single ears, said brush back rotor comprising two coaxial helices of opposite hand disposed to lay ears down from the elevator conveyor sidewalls toward its midplane, the inner ends of said helices being diametrically opposed and lying substantially in a common plane at the elevator conveyor midplane.

2. The conveyor system of claim 1, wherein each rotor helix has a rubber-like peripheral flange portion.

3. The conveyor system of claim 1, wherein the lead of each helix is about 10 inches per revolution.

4. The conveyor system of claim 3, whereby said brush back rotor has a peripheral speed of about 360 feet per minute.

* * * * *